US012453992B2

(12) United States Patent
de Geus

(10) Patent No.: US 12,453,992 B2
(45) Date of Patent: Oct. 28, 2025

(54) CHIMNEY CLEANING SYSTEM

(71) Applicant: Bradley Walter de Geus, Hamilton, MT (US)

(72) Inventor: Bradley Walter de Geus, Hamilton, MT (US)

( * ) Notice: Subject to any disclaimer, the term of this patent is extended or adjusted under 35 U.S.C. 154(b) by 0 days.

(21) Appl. No.: 18/751,903

(22) Filed: Jun. 24, 2024

(65) Prior Publication Data

US 2024/0424538 A1 Dec. 26, 2024

Related U.S. Application Data

(60) Provisional application No. 63/510,116, filed on Jun. 24, 2023.

(51) Int. Cl.

*B08B 9/027* (2006.01)
*F23J 3/02* (2006.01)

(52) U.S. Cl.

CPC ............... *B08B 9/027* (2013.01); *F23J 3/026* (2013.01); *B08B 2209/027* (2013.01)

(58) Field of Classification Search

CPC . F23J 3/02; F23J 3/026; B08B 9/0436; B08B 2209/027; B08B 9/027
USPC .............................................. 15/249.2–249.3
See application file for complete search history.

(56) References Cited

U.S. PATENT DOCUMENTS

| | | | | |
|---|---|---|---|---|
| 730,717 | A * | 6/1903 | Stine | F23J 3/026 15/249.3 |
| 1,516,949 | A * | 11/1924 | Bergerson | F23J 3/026 15/249.2 |
| 3,120,020 | A * | 2/1964 | Schell | F24B 13/006 15/249.2 |
| 4,454,625 | A * | 6/1984 | Kern | F23J 3/026 15/249.3 |
| 4,490,876 | A * | 1/1985 | Haberl | F23J 3/026 15/249.1 |
| 8,341,794 | B1 * | 1/2013 | Sales | B08B 9/021 15/160 |

* cited by examiner

*Primary Examiner* — Laura C Guidotti
(74) *Attorney, Agent, or Firm* — Dorsey & Whitney LLP

(57) ABSTRACT

The present disclosure provides a chimney cleaning system. The chimney cleaning system may include a support bracket configured to couple with a chimney pipe. The chimney cleaning system may include a first swivel arm and a second swivel arm. The system may further include a spring that connects to a first swivel arm. The chimney cleaning system may include a gearbox, and a shaft, which may be a horizontal shaft, coupled to the gearbox. The chimney cleaning system may further include a chain having a first end and a second end. The first end connects with the first swivel arm via the spring and the second end connects to the second swivel arm. The actuation of the shaft causes a rotation of the chain about the internal surface of the chimney pipe thereby causing the chain to clean soot, creosote, and other debris from at least a portion of the internal surface of the chimney pipe.

11 Claims, 17 Drawing Sheets

CHIMNEY CLEANING SYSTEM

CROSS REFERENCE TO RELATED APPLICATIONS

This application claims priority to U.S. Provisional Patent Application No. 63/510,116 filed 24 Jun. 2023 and titled "APPARATUS TO REMOVE DEBRIS AND BUILDUP OF UNDESIRABLE BY-PRODUCTS IN CHIMNEYS", which is hereby incorporated by reference in its entirety for all purposes.

TECHNICAL FIELD

The technology relates generally to a cleaning system, and more specifically to a chimney cleaning system.

BACKGROUND

Chimney pipe cleaning present inherent dangers, with the potential for severe risks and injuries to individuals. Regular cleaning helps to mitigate the risk of house fires, yet existing methods are often dangerous, expensive, and time-consuming. Individuals or professional chimney cleaners may employ tools such as a fiberglass rod with a brush attached to remove soot and creosote, which requires the individual to scale the exterior of their homes and clean the chimney pipe top down to the stove. Alternatively, cleaning from the bottom up within the safety of the house results in a messy interior. A system that would eliminate an individual putting their safety at risk or pay for a professional service and providing a reliable and safe method for effective chimney maintenance, is needed.

The information included in this Background section of the specification is included for technical purposes only and is not to be regarded as subject matter by which the scope of the present disclosure is to be bound.

SUMMARY

The present disclosure provides a chimney cleaning system. In one example, the chimney cleaning system includes a support bracket configured to couple to a chimney pipe. The system further includes a first swivel arm and a second swivel arm and a spring that connects to the first swivel arm. The system further includes a gearbox and a shaft coupled to the gearbox. The shaft may be a horizontal shaft. The system may further includes a chain having a first end and a second end. The first end connects with the first swivel arm via the spring and the second end connects to the second swivel arm. Connection may mean a direct connection or an indirect connection such as a connection via a split ring. Actuation of the shaft causes a rotation of the chain about an internal surface of the chimney pipe thereby causing the chain to clean soot, creosote, and other debris from at least a portion of the internal surface of the chimney pipe.

In some examples, the chimney cleaning system may further include a housing unit that may couple to a stove and the chimney pipe. The housing unit may include a door. The door provides access to the gearbox, the chain, and the second swivel arm.

In some examples, the gearbox, the horizontal shaft, and the second swivel arm are received in the housing unit. In examples, the spring is a tension spring. The first swivel arm connects to the support bracket, and the second swivel arm connects to the gearbox. The first and second swivel arms are made of stainless steel or other carbon steel rod. The housing unit is made of a metal material, and the door is made of a metal material. In some examples, the chain is a wire rope cable.

In some examples, the chimney cleaning system includes a housing unit that may connect to a stove and a chimney pipe. The system may further include a support bracket configured to couple with a chimney pipe. It may further include a first and second swivel arm, and a gearbox received in the housing unit with a horizontal shaft connected to the gearbox. The system may further include a chain that has a first end and a second end, and the first end may connect with the first swivel arm via the spring and the second end may connect to the second swivel arm. The actuation of the horizontal shaft causes rotation of the chain about the internal surface of the chimney pipe thereby causing the chain to clean soot, creosote, and other debris from at least a portion of the internal surface of the chimney pipe.

In some examples, the chimney cleaning system may further include a door defined in the housing unit, and the door may provide access to the gearbox, the chain, and the second swivel arm. The gearbox, the first end of the horizontal shaft and the first end of the second swivel arm are received in a portion of the housing unit. In some examples, the spring is a tension spring. The first swivel arm connects to the support bracket and the second swivel arm connects to the gearbox. The first and second swivel arms are made of stainless steel or other carbon steel rod. The housing unit and the door are made of a metal material.

In some examples, a chimney cleaning system can be provided as a kit. The kit may include a support bracket, a first swivel arm, and a second swivel arm. The kit may further include a chain, a gearbox, a horizontal shaft, and a spring. The chimney cleaning kit may optionally include instructions for installation in a chimney and/or may optionally include instructions for using the system to clean a chimney.

In some examples, the chimney cleaning kit may further include a housing unit. The housing unit in the kit may optionally include a door.

In some examples, a method for installing a chimney cleaning system is provided. The method may optionally include disconnecting a chimney pipe from a stove. The method may also include fastening a support bracket to the chimney pipe. The method may also include joining the housing unit to the stove and optionally, securing the chimney pipe to the housing unit. In a further step, the method includes connecting a chain to a first swivel arm and a second swivel arm.

In some examples, the method may further include removing an appropriate amount of the chain. The method may further include disconnecting the chimney pipe from a chimney. The method may include guiding the chain through the chimney pipe to couple with the first or second swivel arm.

DETAILED DESCRIPTION

Figure 1:
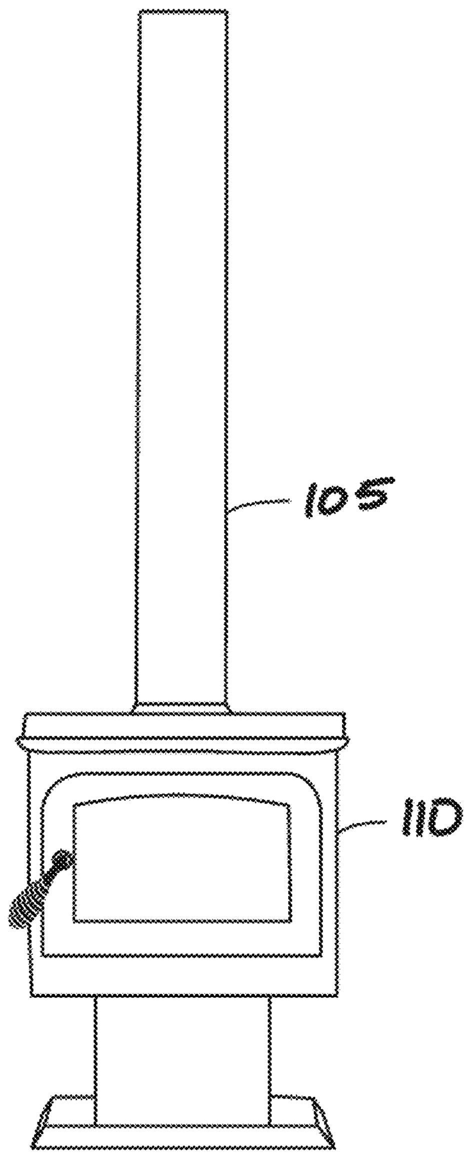
FIG. 1 is a front view of a stove and chimney pipe system without a chimney cleaning system installed.

The present disclosure generally relates to a chimney cleaning system that provides a reliable and safe method for effective chimney cleaning. Inadequately maintained chimney pipes are a leading cause of home heating fires, compelling insurance companies to demand evidence of chimney upkeep for home safety and coverage. Recommended maintenance involves 1 to 2 chimney cleanings annually, as recommended by the National Chimney Sweep Association. As the regular use of a stove accumulates soot, creosote, and other debris on the inner walls of the chimney pipe, annual cleanings are essential. Neglecting proper cleaning may result in the accumulation of highly flammable creosote, posing a significant risk of uncontrolled fires that can lead to property destruction.

Existing methods for chimney cleaning involve individuals using a fiberglass rod with an attached brush. This approach necessitates ascending to the roof of the house to reach the top of the chimney, where user scrapes the inner walls to remove accumulated soot and creosote. However, this method introduces significant dangers, as users may lack the physical capability to scale the roof safely and are susceptible to losing balance or falling due to adverse weather conditions. Alternatively, users may employ the same fiberglass rod and brush from inside the house, cleaning from the bottom of the chimney to the top. However, this method results in a messy interior due to the necessity of opening the stove door and may lead to exposure to toxic chemicals or other air contamination risks.

Recognizing the inherent risks and inefficiencies of manual chimney cleaning, individuals often turn to professional chimney cleaners who employ similar methods. This option can be prohibitively expensive, leaving some users, particularly those who are elderly or facing financial constraints, with limited alternatives. The disclosed chimney cleaning system addresses these concerns by providing a safe and efficient means of cleaning without the need for roof-scaling or the associated mess, catering to a broader demographic of users, including those facing physical limitations or financial challenges.

In one example, the chimney cleaning system includes a housing unit, a support bracket, and a chain. At least a portion of the chimney cleaning system may contact the inner walls of the chimney pipe. For example, the chain in the chimney cleaning system contacts at least a portion of the inner walls of the chimney pipe. The system may further include a gearbox, a horizontal shaft and a first and second swivel arm. The horizontal shaft actuates so that the gearbox causes the second swivel arm to rotate in a full circular motion in a counterclockwise or clockwise direction. The chain is coupled with the first and second swivel arm so that as the second swivel arm rotates the chain and the first swivel arm. In one example, the chain may be replaced with a wire rope or wire rope cable, a cable, a steel fiber, or the like. In specific examples, a specialty-designed stainless-steel cable may replace the chain. In this example, the stainless-steel cable may incorporate embedded steel fibers. The system traverses a portion of or the entirety of the inner surface of the chimney pipe and provides a brushing, sweeping or dislodging motion, e.g., via the chain. In one example, the actuation of the horizontal shaft is done by hand (e.g., a hand crank) or with the use of a power drill. In this way, the chimney cleaning system can be operated by a user of any age or ability. For example, a user who cannot climb to the top of their house to clean the chimney pipe can now clean their chimney pipe from inside of their house. The chimney cleaning system can be run while the stove door is closed. In this way, as the chimney cleaning system is in operation there is not a mess accumulating in the house. For example, all soot, creosote, and other debris are collected at the bottom of the stove, where it can be accessed and discarded at the end of the cleaning cycle to provide for an easy clean up. The system may be integrated into an existing stove and chimney pipe system. For example, the user may take the chimney cleaning system and couple the system between an existing stove and an existing chimney pipe. In this way, the chimney cleaning system affords the user the flexibility to effortlessly perform chimney maintenance.

Turning to the figures, illustrative embodiments of the present disclosure will now be discussed in more detail. FIG. 1 is a front view of a stove and chimney pipe system without a chimney cleaning system 100 installed. A stove 110 may house a fire that heats a house. For example, a user may load the stove 110 full of wood and start a fire that warms a house. A chimney pipe 105 attaches to the stove 110 and used to direct harmful byproducts of a fire away from a house. In one example, the chimney pipe 105 may be a vertical shaft that may be coupled to the stove extending perpendicularly to the top surface of the stove 110 and lead out to the roof of a house. In this way, the chimney pipe 105 may be a hollow tubular body. It should be understood that a chimney pipe 105 can include a chimney tube, a single layer pipe, a triple layer pipe, or the like. During normal operations of the stove 110, soot, creosote, and other debris begin to coat the walls of the chimney pipe 105. For example, the longer a stove 110 is in operation the more soot, creosote, and other debris coat the walls of the chimney. In this way, the soot, creosote, and other debris narrow the walls of the chimney pipe 105 and may lead to a chimney fire. For example, creosote is a highly flammable chemical compound that may be ignited during normal operations of a stove 110 and chimney pipe 105 if the creosote has not been cleaned from the walls of the chimney pipe 105. The chimney pipe and stove system are made of materials such as stainless steel, carbon steel, traditional steel, or the like.

Figure 2:
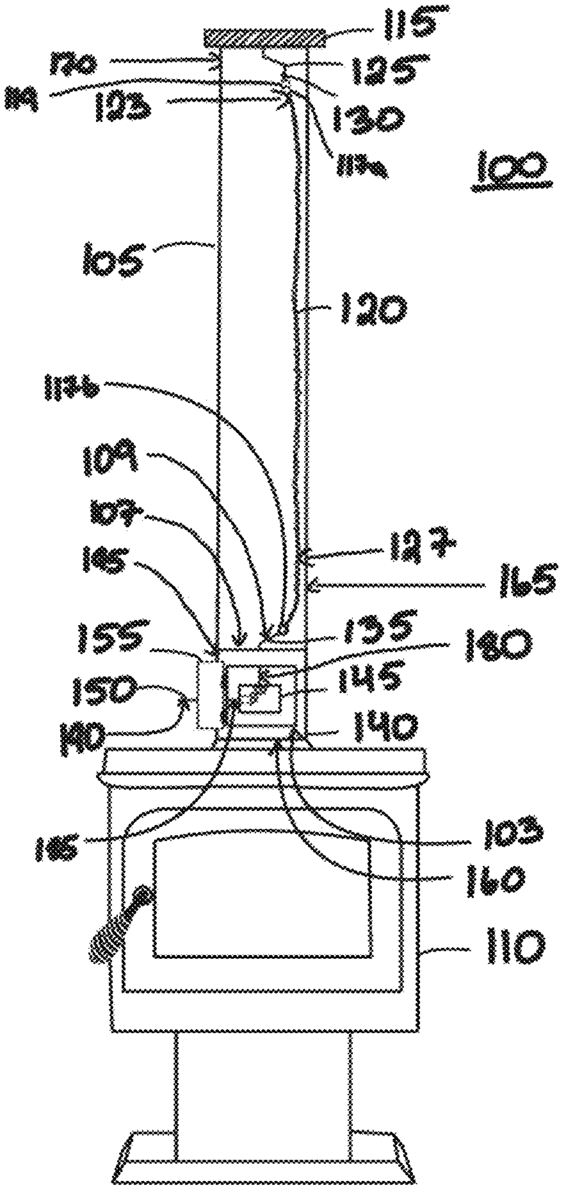
FIG. 2 is a front view of a stove and chimney pipe system with a chimney cleaning system as described herein, the system shown installed.
Figure 3:
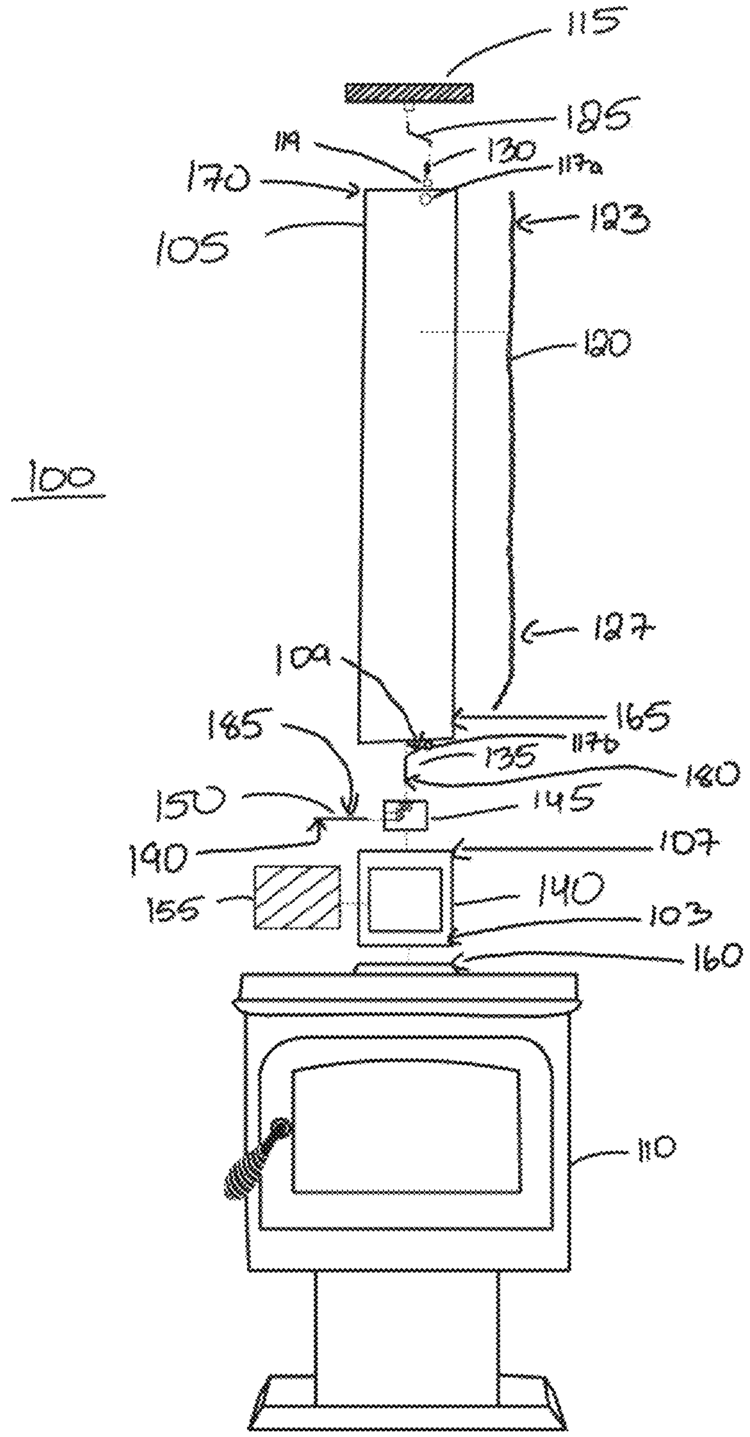
FIG. 3 is an exploded view of the stove and chimney pipe system with a chimney cleaning system installed in accordance with FIG. 2.

FIG. 2 is a front view of a stove and chimney pipe system with a chimney cleaning system 100 installed. FIG. 3 is an exploded view of the chimney pipe system with a chimney cleaning system 100 installed. As seen in FIG. 2 and FIG. 3, the chimney cleaning system 100 cleans and removes soot, creosote, and other debris in a chimney pipe 105. For example, the system 100 or a portion of the system 100 contacts at least a portion of the inner walls of the chimney pipe 105. For instance, the user actuates the system 100 so that a portion of the system 100 cleans and remove soot, creosote, and other debris from the internal surface of the chimney pipe 105. The system 100 may be operated so that the user is within the house and does not have to scale the house. For instance, the age or physical ability of the user does not affect the efficiency of the chimney cleaning system 100. As explained more fully below, the system 100 may be coupled with the stove 110 and the chimney pipe 105. For example, a user may modify the existing stove 110 and chimney pipe 105 to install the chimney cleaning system 100.

Figure 4:
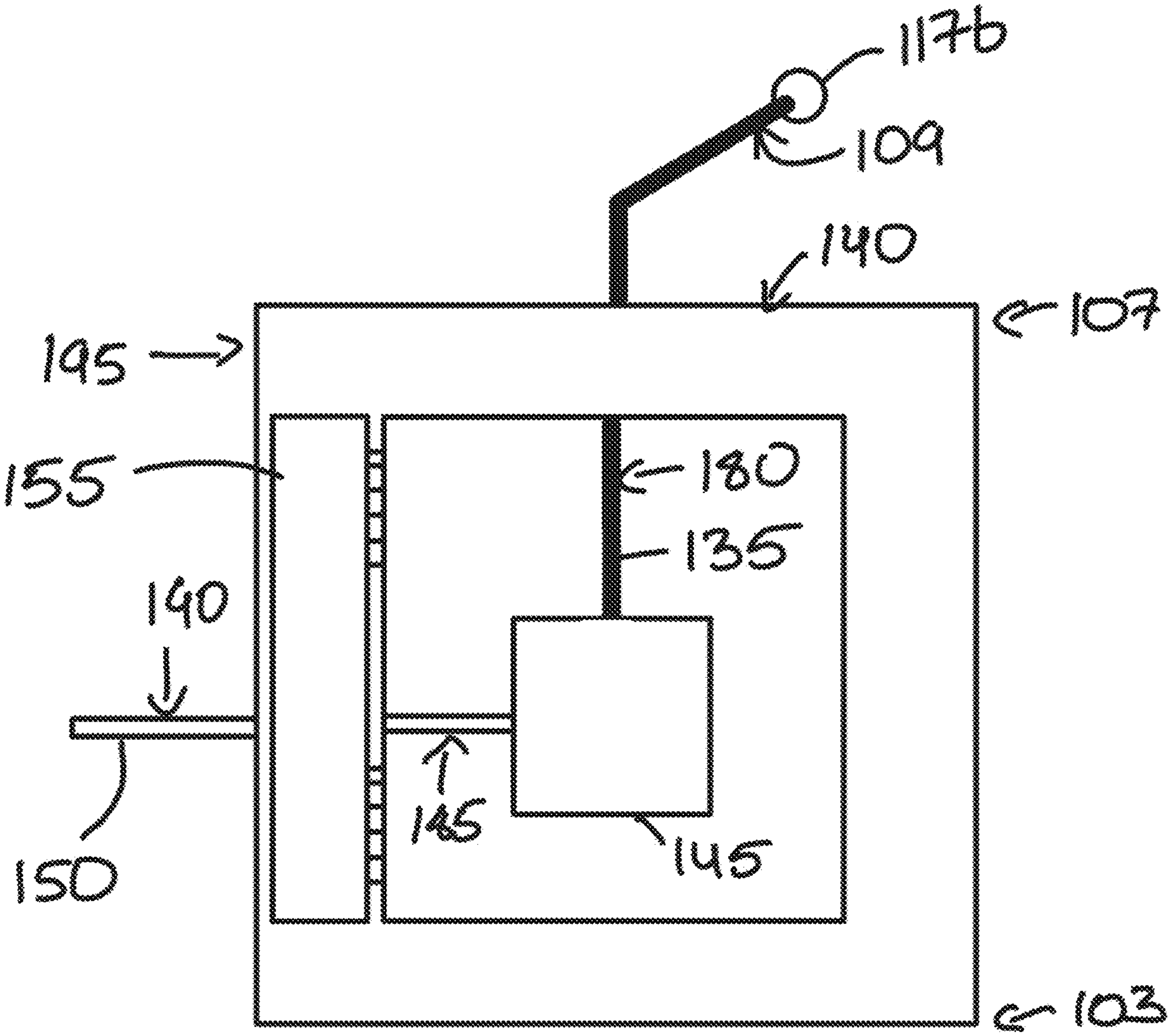
FIG. 4 is a front view of the chimney cleaning system housing unit.

The system 100 may include at least one housing unit 140. As seen in FIG. 2 and FIG. 4, the housing unit 140 may be defined by the size, shape, and material of the existing stove 110 and/or chimney pipe 105. For example, the chimney pipe 105 may be a carbon steel, circular, hollow bodied pipe. In this instance, the housing unit 140 may be a carbon steel circular, hollow bodied pipe of the same diameter as the chimney pipe 105. In this way, the housing unit 140 matches the size, shape, and material of the existing chimney pipe 105. In one example, the housing unit 140 may be 0.0065 inches thick. The housing unit 140 may couple with a first end 160 of the stove 110. For example, a first end 103 of the housing unit 140 is fastened to the first end 160 of the stove 110 which may be the location where the existing chimney pipe 105 is fastened. The housing unit 140 may be a 6 inch to 2 foot insert of pipe that may match the size, shape, and material of the chimney pipe 105. In this way, the first end 103 of the housing unit 140 may be fastened to the first end 160 of the stove 110. The chimney pipe 105 may be fastened to the housing unit 140. For example, a second end 107 of the housing unit 140 may be coupled to a first end 165 of the chimney pipe 105. In this way, the integrity of the chimney pipe 105 and stove system is restored with a housing unit 140 coupled with the first end 160 of the stove 110 and the first end 165 of the chimney pipe 105. In this example, the housing unit 140 may be fastened to the stove 110 and the chimney pipe 105 via screws, rivets, collar, press fit, or the like. The housing unit 140 is made of materials such as, carbon steel, stainless steel, traditional steel, or the like.

The system 100 may include at least one gearbox 145. The gearbox 145 may be received in the housing unit 140. As shown in FIG. 2, the gearbox 145 may include two or more gears working together to change the speed or the direction of rotation. As shown in FIG. 2 and FIG. 4, the system 100 may include at least one horizontal shaft 150. A first end 185 of the horizontal shaft 150 may be received in the housing unit 140. A second end 190 of the horizontal shaft 150 protrudes perpendicularly out of the housing unit wall 195. The horizontal shaft 150 connects to the gearbox 145. The actuation of the horizontal shaft 150 actuates the gearbox 145. For example, the second end 190 of the horizontal shaft 150 rotates and in turn rotates the horizontal shaft 150 that actuates the gearbox 145. In this example, the horizontal shaft 150 may be rotated by a user (e.g. via a hand crank), a power drill, or the like. In this way the rotation of the horizontal shaft 150 may then transfer the power to the gearbox 145 that may then transfer the generated power. The horizontal shaft 150 is made of materials such as stainless steel, carbon steel, traditional steel, or the like.

The system 100 may include at least one second swivel arm 135. The second swivel arm 135 allows for rotational movement around a fixed point or axis. As shown in FIG. 2 and FIG. 4, the second swivel arm 135 extends outwardly towards the walls of the chimney pipe 105. The second swivel arm 135 may have a first end 180 of the second swivel arm 135 and a second end 109 of the second swivel arm 135. The first end 180 of the second swivel arm 135 may couple with the gearbox 145. The first end 180 of the second swivel arm 135 may be received in the housing unit 140. The second end 109 of the second swivel arm 135 may be housed in the chimney pipe 105. In one example, both the first end 180 of the second swivel arm 135 and the second end 109 of the second swivel arm 135 may be housed in the housing unit 140. When the horizontal shaft 150 rotates, the rotating horizontal shaft 150 transfers power to the gearbox 145 that then transfer's power to the second swivel arm 135. In this way, the power transferred from the gearbox 145 rotates the second swivel arm 135 in a complete circular rotation. For instance, the second swivel arm 135 may rotate in a counterclockwise direction or a clockwise direction. The second swivel arm 135 is made of materials such as stainless steel, carbon steel, traditional steel, or the like.

The system 100 includes at least one support bracket 115. The support bracket 115 connects with the chimney pipe 105. For example, the support bracket 115 fastens to a second end 170 of the chimney pipe 105. The support bracket 115 may be fastened with the second end 170 of the chimney pipe 105 via screws, rivets, collar, press fit, or the like. The support bracket 115 is made of materials such as carbon steel, stainless steel, or the like. In one example, the support bracket 115 can include tabs used for fastening on the inner perimeter (See FIG. 8). In another example, the support bracket 115 can include tabs used for fastening on the outer perimeter (See FIG. 9). In yet another example, the support bracket 115 may be welded into a pipe that may be connected to the second end 170 of the chimney pipe 105 (See FIG. 10).

The system may include at least one first swivel arm 125. The first swivel arm 125 may couple with the support bracket 115. As shown in FIG. 2, the support bracket 115 may be coupled with the chimney pipe 105 and the first swivel arm 125 may be coupled with the support bracket 115. In this way, the first swivel arm 125 may be housed in the chimney pipe 105. For example, the first swivel arm 125 is connected to the support bracket 115 so the first swivel arm 125 has freedom of rotation. In this way, the first swivel arm 125 may rotate in a complete circular rotation in a counterclockwise or clockwise direction. The first swivel arm 125 is made from materials such as stainless steel, carbon steel, traditional steel, or the like.

The system 100 may include at least one spring 130. The spring 130 may couple with the first swivel arm 125. The spring 130 may be housed in the chimney pipe 105. The spring 130 may be a tension spring, extension spring, or the like. In one example, the spring 130 may be between 3 inches and 6 inches in length.

The system 100 may include at least one chain 120. In another example, the system 100 may include a wire rope, a steel cable that is several steel fibers braided together, or the like other than the chain 120. As shown in FIG. 2 and FIG. 3, the chain 120 may have a first end 123 and a second end 127. As shown in FIG. 2 and FIG. 3, the chain 120 may connect to the first swivel arm 125 via a stainless steel swivel 119 and a stainless steel split ring 117*a*. In this example, the first end 123 of the chain 120 connects to the stainless steel split ring 117*a*, then the stainless steel split ring 117*a* connects to the stainless steel swivel 119, and the stainless steel swivel 119 connects to the first swivel arm 125. This may be advantageous, as the swivel 119 and the split ring 117*a* allows the chain 120 to spin without possible kinking or damage to the spring 130. As shown in FIG. 2 and FIG. 3, the second end 127 may couple with the second swivel arm 135 via a stainless steel split ring 117*b*. For example, the chain 120 is housed in the chimney pipe and connects to the first swivel arm 125 and the second swivel arm 135 that rotates. In this way, the horizontal shaft 150 may be actuated that powers the gearbox 145, that causes the second swivel arm 135 to rotate, that causes the chain 130 to rotate in a full circular rotation. For instance, the chain 120 may rotate in a counterclockwise or clockwise direction. In one example, a portion of the chain 120 is in contact with an inner surface 111 of the chimney pipe 105. For example, the contact between the chain 120 and the inner surface 111 of the chimney pipe 105 causes the chain 120 to remove soot, creosote, and other debris. In this way, as the chain 120 is rotating in contact with the inner surface 111 of the chimney pipe 105. The chain 120 cleans at least the portion of the chimney pipe 105 that is in contact with the chain 120. For example, as the chain 120 cleans/removes debris, etc. from the inner surface 111 of the chimney pipe 105, the soot, creosote, and other debris removed falls into the bottom of the stove 110. In this way, the stove 110 is secured during the cleaning process, so no soot, creosote, or other debris may leave the stove and chimney system 200. The chain 120 is made from material such as carbon steel, stainless steel, or the like. In some examples, the chain 120 may be a traditional chain or may be a wire rope or wire rope cable, a braided cable, or the like.

Figure 14:
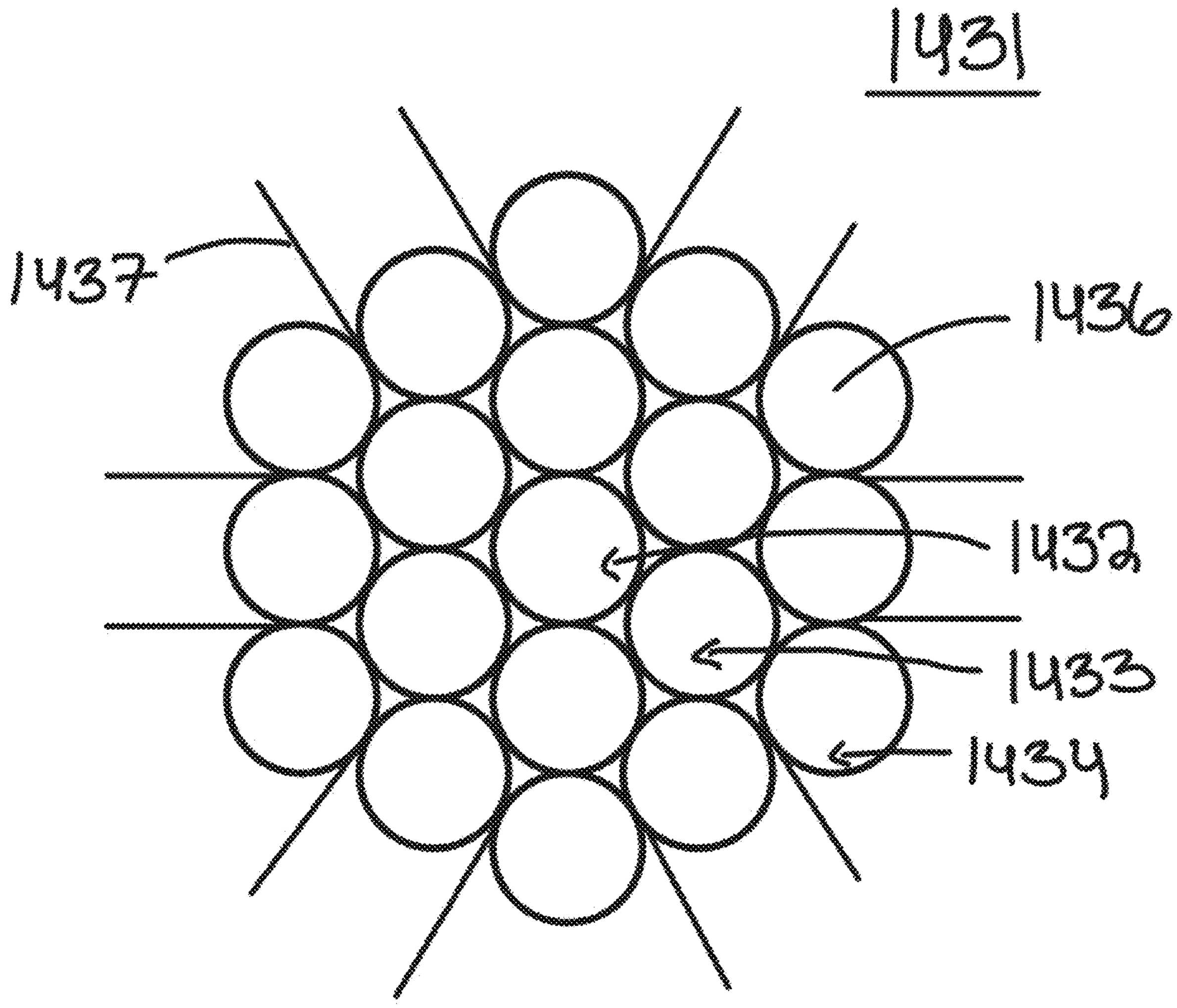
FIG. 14 illustrates a cross section view of a wire rope cable with fine steel brush-like fibers extending out of the rope cable structure in such a manner as to create a continuous brush-like rope cable structure.

In one example, the system 100 may include a chain 120 that is a wire rope cable 1431, such as the example depicted in FIG. 14. The cable 1431 has three layers of wires 1436 connected to form the wire rope cable 1431. The wires 1436 that make up the wire rope cable 1431 is made from material such as carbon steel, stainless steel, or the like. As shown in FIG. 14, the first layer 1432 may be one piece of wire 1436, the second layer 1433 may be 6 pieces of wire 1436, and the third layer 1434 may be 12 pieces of wire 1436. In one example, the wire rope cable 1431 may have fibers 1437 woven and embedded into the wire rope cable 1431. As shown in FIG. 14, the fibers 1437 extend outward from the wire rope cable 1431. The fibers 1437 is made from material such as carbon steel, stainless steel, or the like. This can be advantageous because when the wire rope cable 1431 rotates as part of the system 100, the fibers of the wire rope cable 1431 may penetrate the soot, creosote, or other debris and clean more of the inner surface 111 of the chimney pipe 105.

Referring back to FIG. 2 and FIG. 3, in some embodiments, the system 100 includes at least one door 155. The door 155 may be defined in the housing unit 140. In one example, the door 155 can be secured to housing unit 140 via fastening a screw, a bolt, or the like. In another example, the door 155 connects to the housing unit 140 via a spring loaded hinge, a barrel hinge, an overlay hinge, or the like. The door 155 provides access to the gearbox 145, the second swivel arm 135, the chain 120, and the first end of the horizontal shaft 185. For example, the door 155 provides access to the chain 120 that may couple to the second swivel arm 135 via a split ring 117*b*. In this way, the user may couple the chain 120 to the second swivel arm 135 during the installation process. In another example, if a component fails, the door 155 provides easy access to replace a component located in the housing unit 140. In another example, the door 155 may provide access to clean the components that are located in the housing unit 140. The door is made of any suitable material such as carbon steel, stainless steel, traditional steel or the like.

Figure 5:
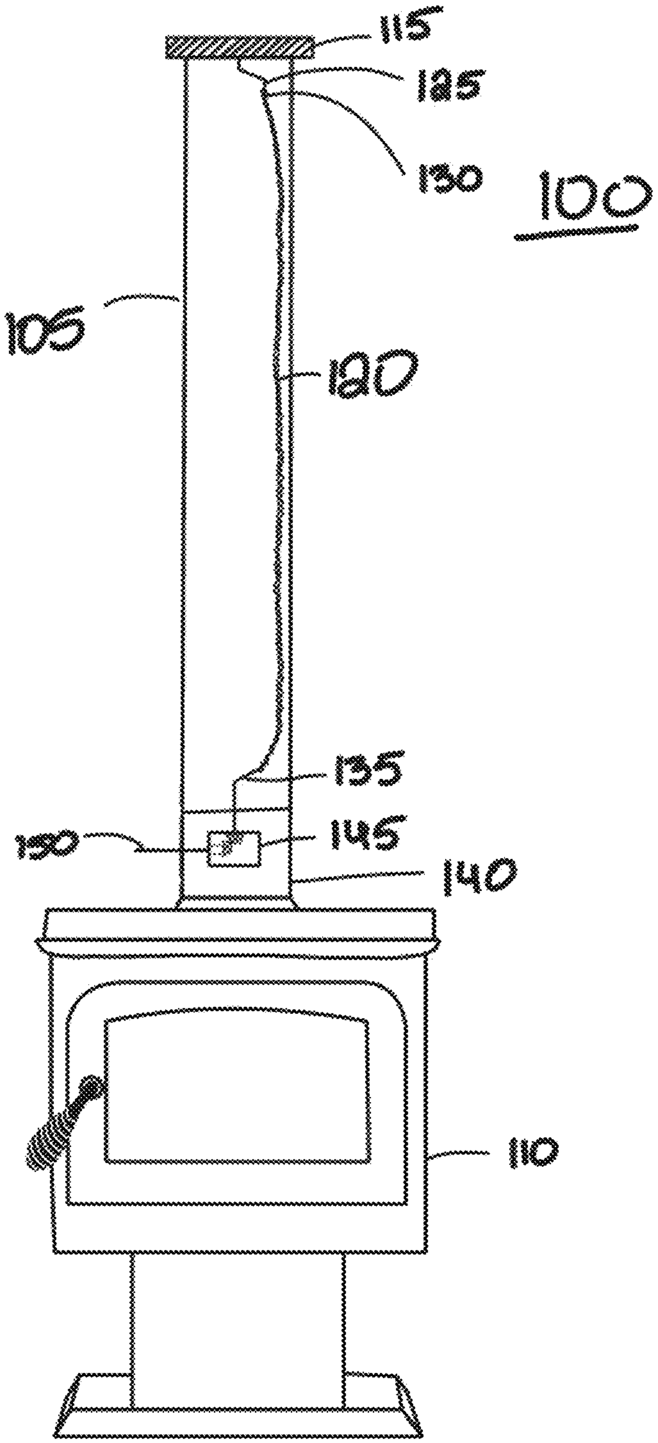
FIG. 5 is a front view of one example of the chimney cleaning system that is installed on a stove and chimney pipe system.

In some embodiments, the system 100 may not include the door 155, such as the example depicted in FIG. 5. FIG. 5 is a front view of one example of the chimney cleaning system 100 that is installed on a stove and chimney pipe system. As shown in FIG. 5, the housing unit 140 is a singular circular, hollow bodied pipe and that does not define or include a door 155. In this way, the gearbox 145, the first end 185 of the horizontal shaft 150, and the second swivel arm 135 are housed in the housing unit 140. This may be advantageous, as the housing unit 140 is a singular hollow body and does not lead to any possible sealing failures along a door 155 that may allow smoke to pass through. This may also be advantageous, as without a door 155, it simplifies the manufacturing process.

Figure 6:
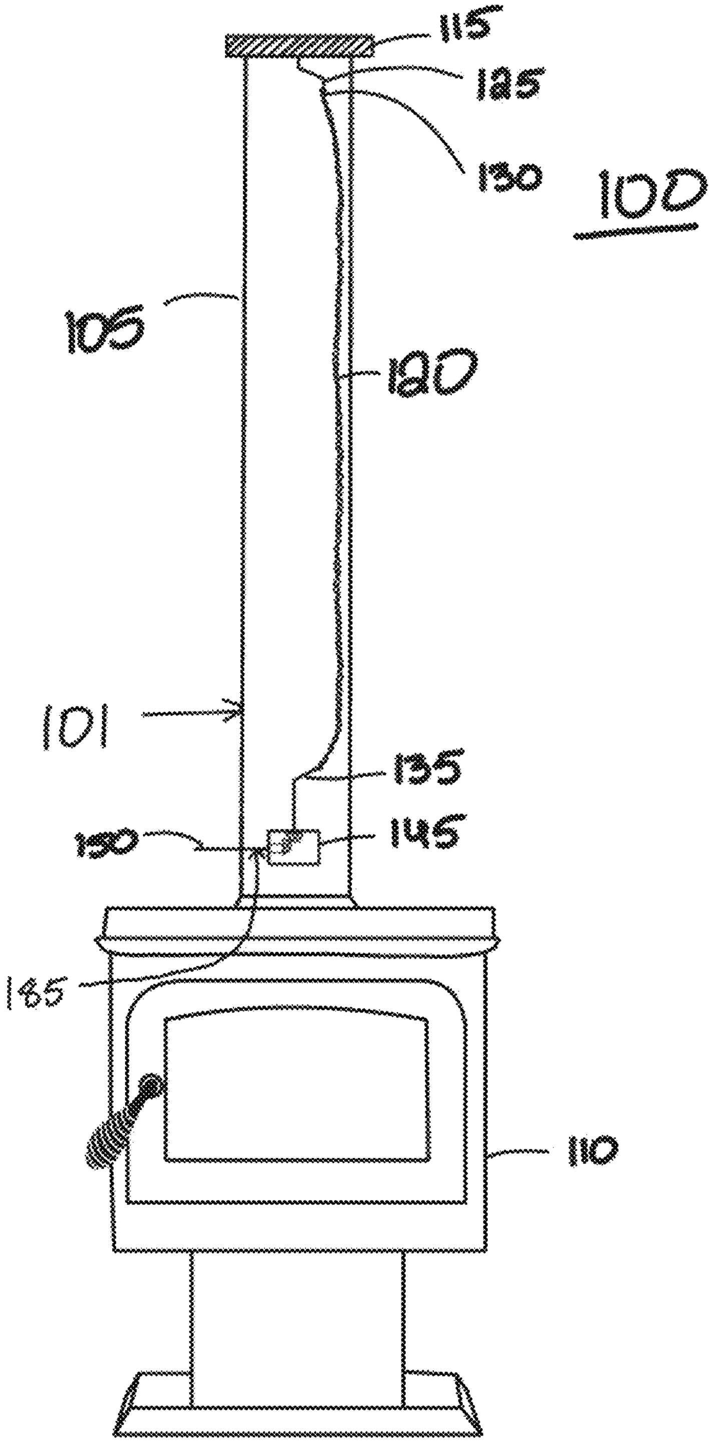
FIG. 6 is a front view of one example of the chimney cleaning system that is installed on a stove and chimney pipe system.

FIG. 6 is a front view of one example of the chimney cleaning system that is installed on a stove and chimney pipe system 100. In this example, the system 100 does not include a housing unit 140. Instead, the user installs the chimney pipe system 100 into a pre-existing chimney pipe 105. In one example, the user may drill holes into the chimney pipe 105 to allow the horizontal shaft 150 to pass through a wall 101 of the chimney pipe 105. The user may secure the gearbox 145 to the wall 101 of the chimney pipe 105. As shown in FIG. 5, the horizontal shaft 150 connects to the gearbox 145 as well as the second swivel arm 135 connects to the gearbox. The support bracket 115 is connected to the top of the chimney pipe 105, and the first swivel arm 125 is connected to the support bracket 115. The chain 120 may then be connected to the first swivel arm 125 and the second swivel arm 135. In this example, the first end 185 of the horizontal shaft 150, the gearbox 145, the first swivel arm 125, the second swivel arm 135, the spring 130, and the chain 120 are housed within the chimney pipe 105. This may be advantageous, as installing the chimney pipe system 100 into a pre-existing chimney pipe 105 does not require the user to alter the pre-existing chimney pipe 105 to install the housing unit 140.

Figure 7:
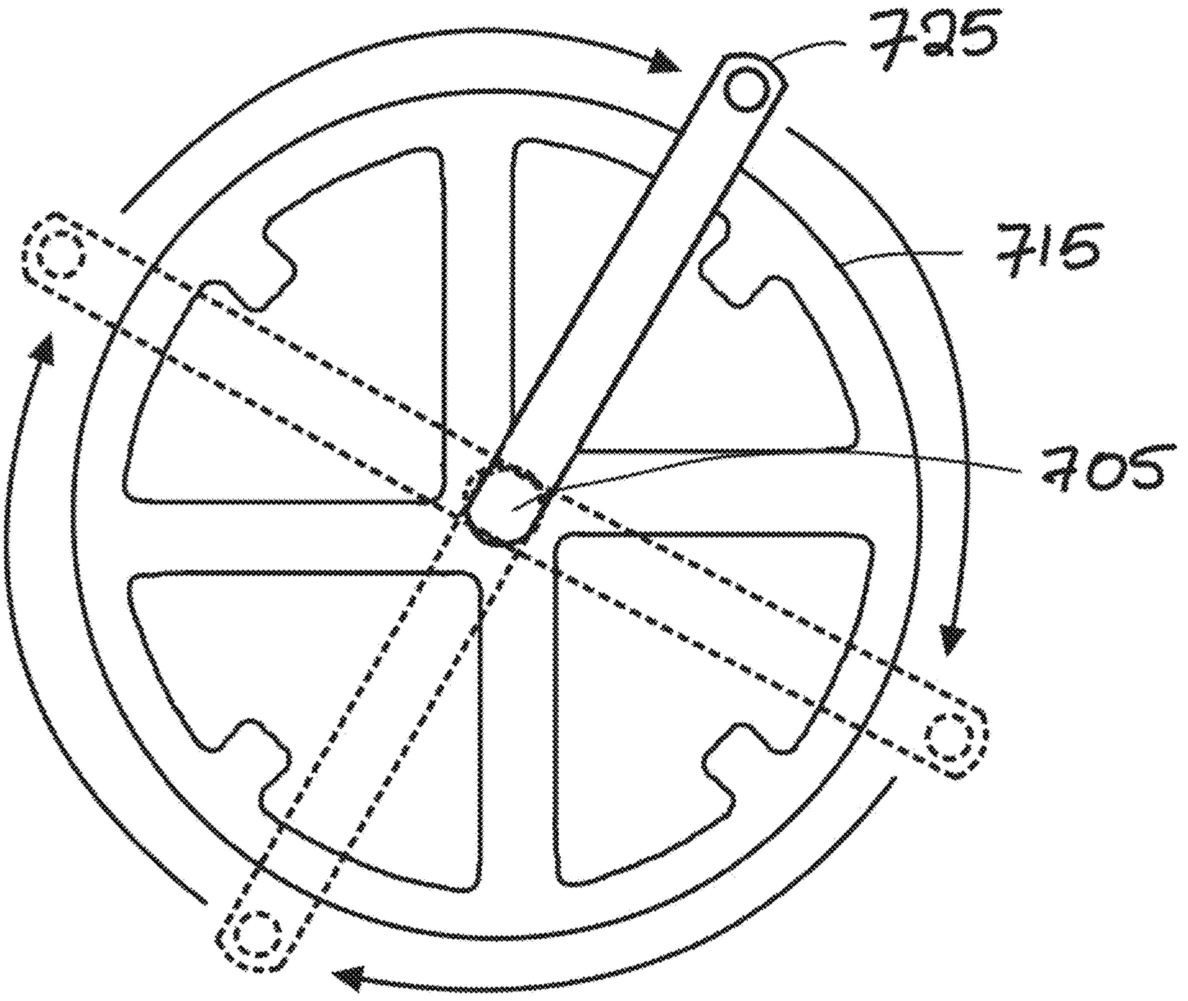
FIG. 7 is a perspective view of the support bracket and the first swivel arm making one full rotation.

FIG. 7 is a perspective view of the support bracket 715 and the first swivel arm 725 making one full rotation. As shown in FIG. 7, the swivel arm 725 is connected to the support bracket 715 and rotates around a fixed point or axis 705. In one example, the swivel arm 725 may connect to the gearbox 145 and rotate in a complete circle. The swivel arm 725 may rotate in a counter-clockwise or clockwise direction. As shown in FIG. 7, the swivel arm 725 may extend outward from the fixed point 705. This may be advantageous because as the swivel arm 725 extends outward from the fixed point 705 and is connected to the chain 120, it guides the chain 120 to have more contact with the inner surface 111 of the chimney pipe 105. In this way, the rotation of the swivel arm 725 enables the chain 120 to clean the soot, the creosote, and other debris from the inner surface 111 of the chimney pipe 105. In one example, the length of the swivel arm 725 can be extended or shortened based on the radius of the chimney pipe 105.

Figure 8A:
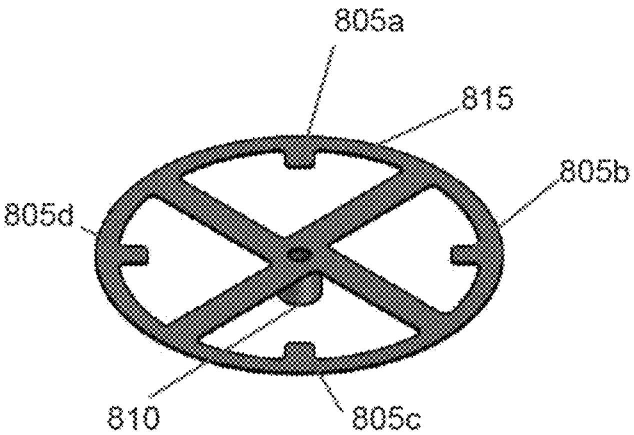
FIG. 8A illustrates a top view of one example of the support bracket.
Figure 8B:
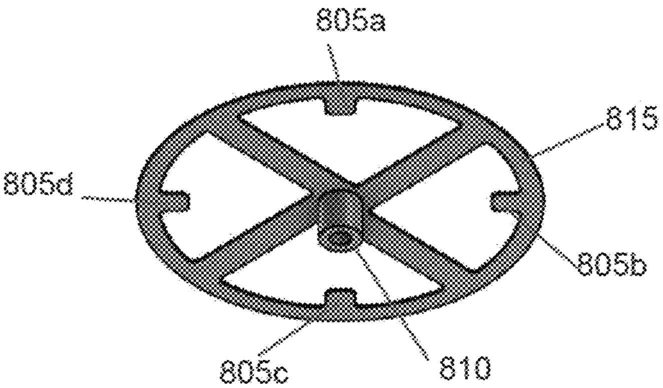
FIG. 8B illustrates a bottom view of one example of the support bracket.
Figure 8C:
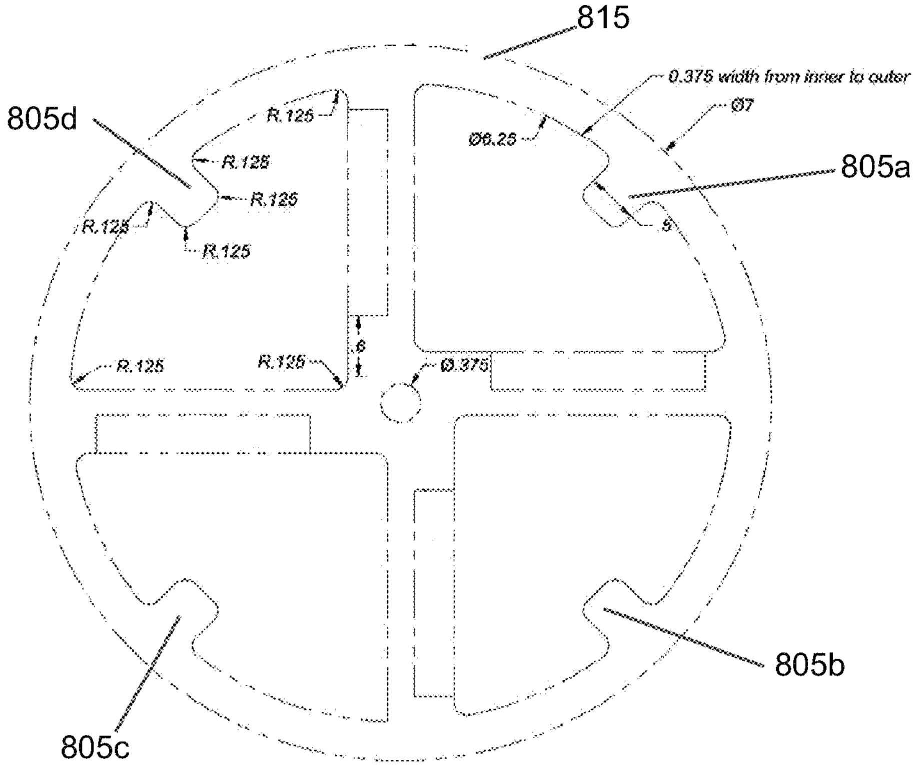
FIG. 8C illustrates an engineering drawing of one example of the support bracket.
Figure 8D:
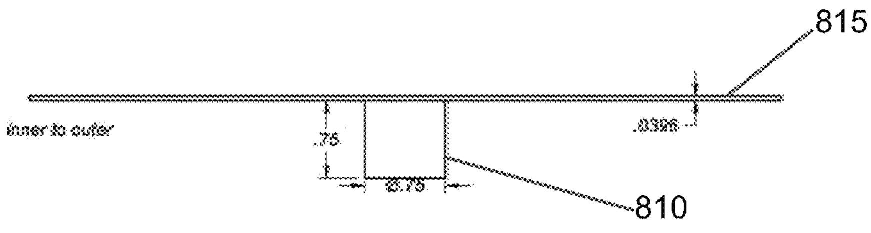
FIG. 8D illustrates a side view of one example of the support bracket.

FIGS. 8A, 8B, 8C, and 8D illustrates one example of a support bracket 815. In this example, the support bracket 815 may be a circular body that may have a larger diameter than the chimney pipe 105. The support bracket 815 has a bushing 810 that may couple to the first swivel arm 125. The bushing 810 is welded to the first swivel arm 125 during the manufacturing process. In one example, the bushing 810 may include a washer to secure the bushing 810 and first swivel arm 125 together. In one example, the support bracket 815 may include at least one securement tab 805. The securement tab 805 may secure the support bracket 815 to the chimney pipe 105. In one example, the securement tab 805 may be bent downward to allow the securement tab 805 to be fasted to the chimney pipe 105. The securement tab 805 may be fastened to the chimney pipe 105 by a screw, self-tapping screw, or the like. As shown in FIGS. 8A, 8B, 8C, the securement tabs 805*a-d*, can extend inward from the perimeter of the support bracket 815. This may be advantageous as a chimney pipe 105 with a smaller radius may be used and securement tabs 805*a-d* extending inward may enable a more secure fastening to the chimney pipe 105. In one example, the support bracket 815 may be a larger diameter than a 6 in diameter chimney pipe. In this example, the securement tabs 805*a-d* may be bent downward enabling the support bracket 815 to lay flat on top of the chimney pipe 105 with the securement tabs 805*a-d* bent downward inside of the chimney pipe 105. In this way, the downward bent support brackets 815 may be fasted to the inside wall of the chimney pipe 105. In this example, the securement tabs 805*a-d* may be fastened to the walls of the chimney pipe 105 via screws, self-tapping screws, or the like.

Figure 9A:
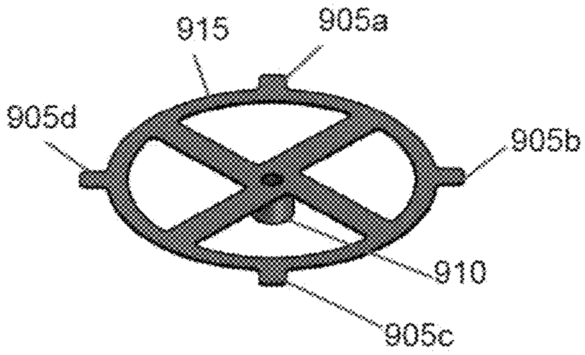
FIG. 9A illustrates a top view of one example of the support bracket.
Figure 9B:
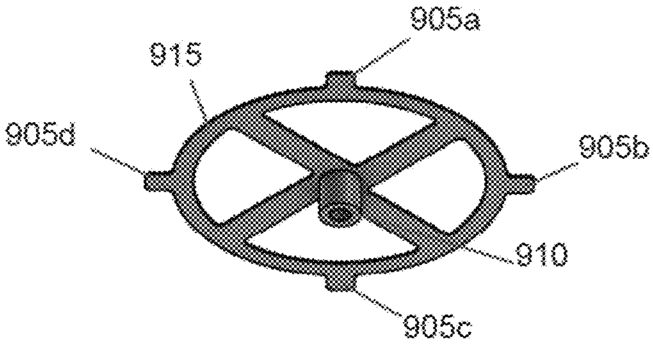
FIG. 9B illustrates a bottom view of one example of the support bracket.
Figure 9C:
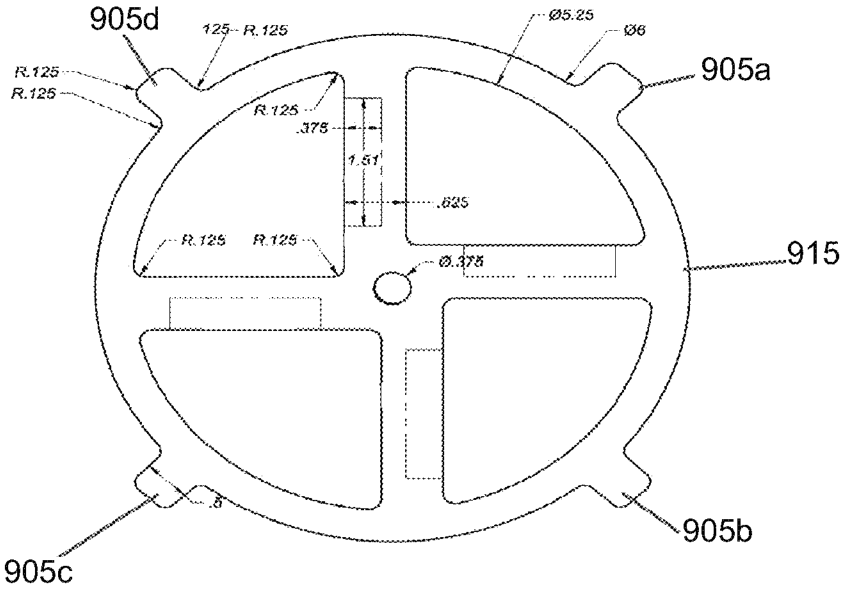
FIG. 9C illustrates an engineering drawing of one example of the support bracket.
Figure 9D:
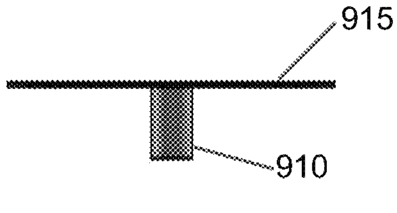
FIG. 9D illustrates a side view of one example of the support bracket.

FIGS. 9A, 9B, 9C, and 9D illustrates one example of a support bracket 915. The support bracket 915 diameter will align with the diameter of the chimney pipe 105. As shown in FIGS. 9A, 9B, and 9C, the securement tabs 905*a-d* extend outwardly from the perimeter of the support bracket 915. In one example, the securement tabs 905*a-d* may be bent upward, allowing the support bracket 915 to be housed within the chimney pipe 105. In this example, the securement tabs 905*a-d* may be fastened to the walls of the chimney pipe 105 via screws, self-tapping screws, or the like. The may be advantageous, as the support bracket 915 being housed within the chimney pipe 105 allows the rain cap to be reinstalled to the top of the chimney pipe 105. The support bracket 915 with securement tabs 905*a-d* may be most advantageous to use on triple wall chimney pipes 105.

Figure 10:
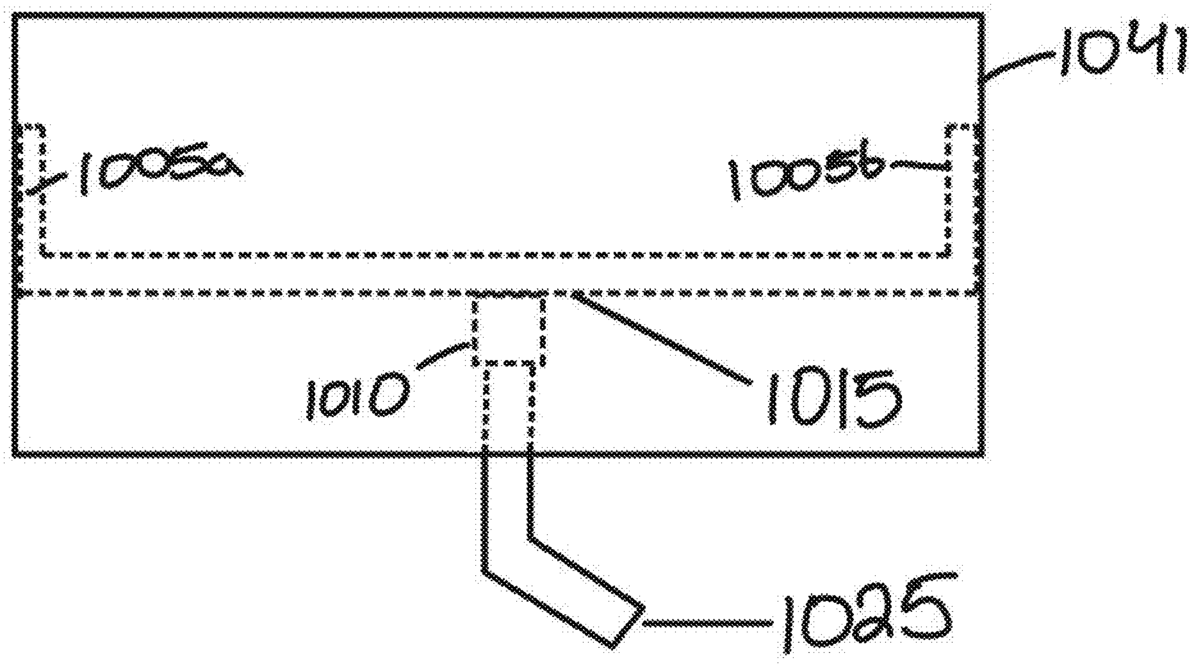
FIG. 10 illustrates one example of a support bracket.

FIG. 10 illustrates one example of a support bracket 1015. In one example, the support bracket 1015 is coupled to a second housing unit 1041. As shown in FIG. 10, the securement tabs 1005*a-b* are bent upward as the support bracket 1015 is housed within the second housing unit 1041. In this example, the securement tabs 1005*a-b* are welded to the second housing unit 1041 to secure the support bracket 1015 to the second housing unit 1041. In this example, the support bracket 1015 can include a bushing 1010 that the first swivel arm 1025 may couple with the bushing 1010. The support bracket 1015 will be pre-assembled and welded before the user receives the support bracket 1015. In this way, the support bracket 1015 may be placed on top of the existing single wall chimney pipe 105 with the rain cap installed on top of the second housing unit 1041 of the support bracket 1015. In one example, the second housing unit 1041 may be 3 inches to 1 foot in height and may be 6 inches in diameter. In this way, the diameter of the second housing unit 1041 may be 6 inches in diameter to sit atop the 6 inch diameter chimney pipe 105. This may be advantageous for use on a single wall chimney pipe 105. In this way, holes are not made through the single wall chimney pipe 105 while fastening the support bracket 1015.

Figure 11A:
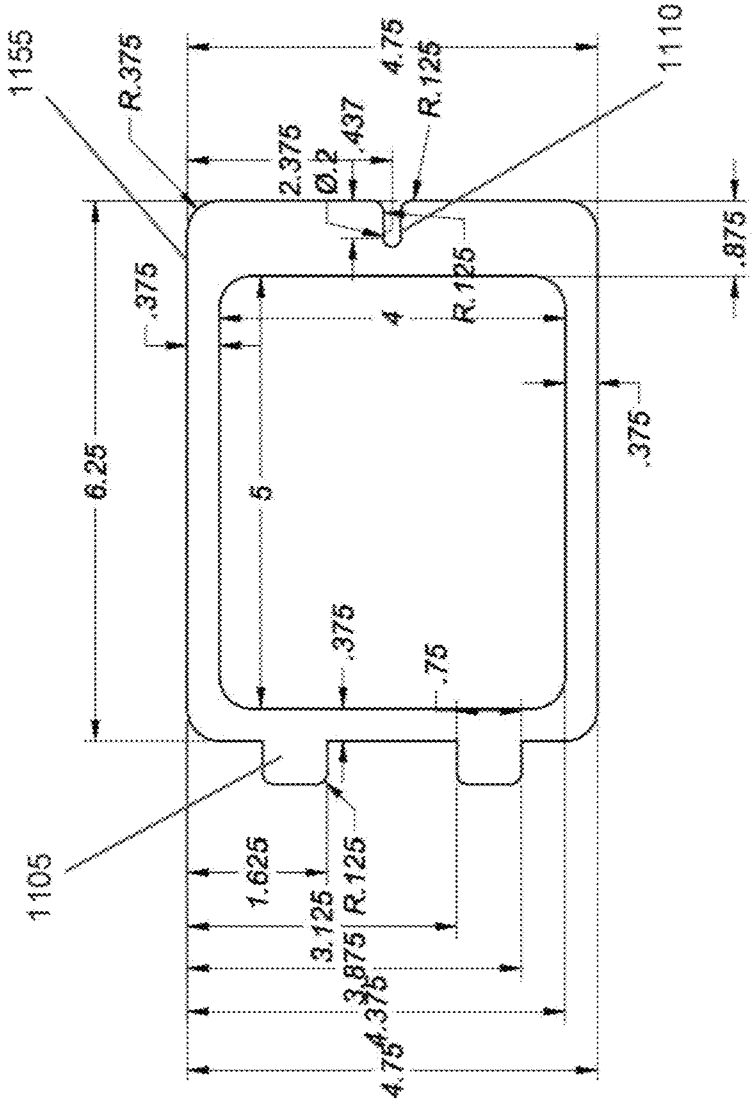
FIG. 11A illustrates an engineering drawing of one example of the door of the housing unit.
Figure 11C:
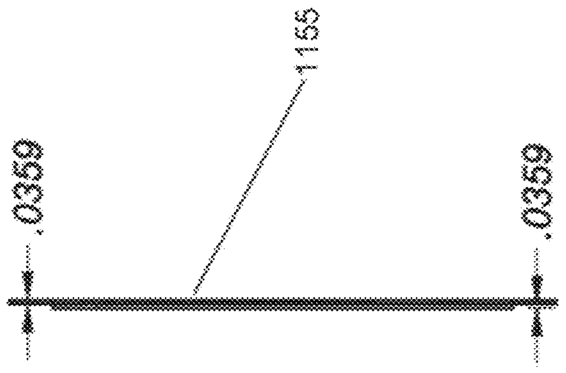
FIG. 11C illustrates a side view of one example of the door of the housing unit.
Figure 11B:
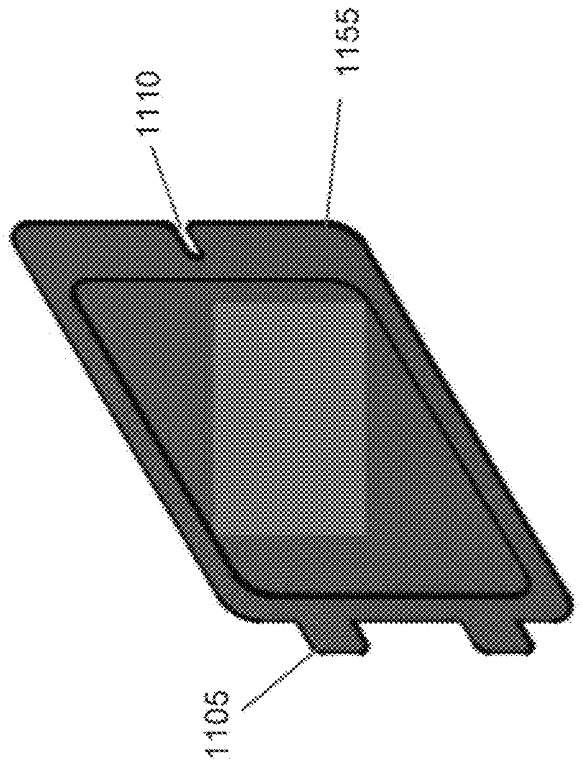
FIG. 11B illustrates a perspective view of one example of the door of the housing unit.

FIGS. 11A, 11B, and 11C illustrates one example of the door 1155 of the housing unit 140. As can be understood from FIG. 2, in one example, the door 1155 may be defined in or by the housing unit 140. This may be advantageous as the door 1155 enables access to the components housed in the housing unit 140 for replacement or cleaning. In this way, when the door 1055 is closed it creates a seal that prevents smoke or other debris from escaping when the stove 110 is operational. Turning back to FIG. 11B, the door 1155 may include at least one securement tab 1105. As shown in FIG. 11A and FIG. 11B, the door 1155 has two securement tabs 1105 that connect the door 1155 to the housing unit 140. The securement tab 1105 enables the door 1155 to be opened while connected to the housing unit 140. The securement tab 1105 may include a threaded hole where the door 1155 can be secured to the housing unit 140. In one example, the door 1155 can be secured to housing unit 140 via fastening a screw, a bolt, or the like through securement points in the securement 1105. The door 1155 may further include at least one securement point 1110. In one example, as shown in FIGS. 11A and 11B, the securement point 1110 may be a notch. The notch receives a latch connected to the housing unit 140 to lock the door 1155 to the housing unit 140 ensuring a seal is created. In another example, the securement point 1110 may receive a screw, a bolt, or the like to secure the door 1155 to the housing unit 140. This may be advantageous as a securement point 1110 enables the door 1155 to be secured during operation and enables the door 1155 to be opened for maintenance or the like. The latch may include a cam latch, a slam latch, a spring latch, or the like. In yet another example, the securement tabs 1105 may secure into a housing defined by the housing unit 140. In this way, the door 1155 may be secured shut via the slotted securement tabs 1105 and the securement point 1110.

Figure 12:
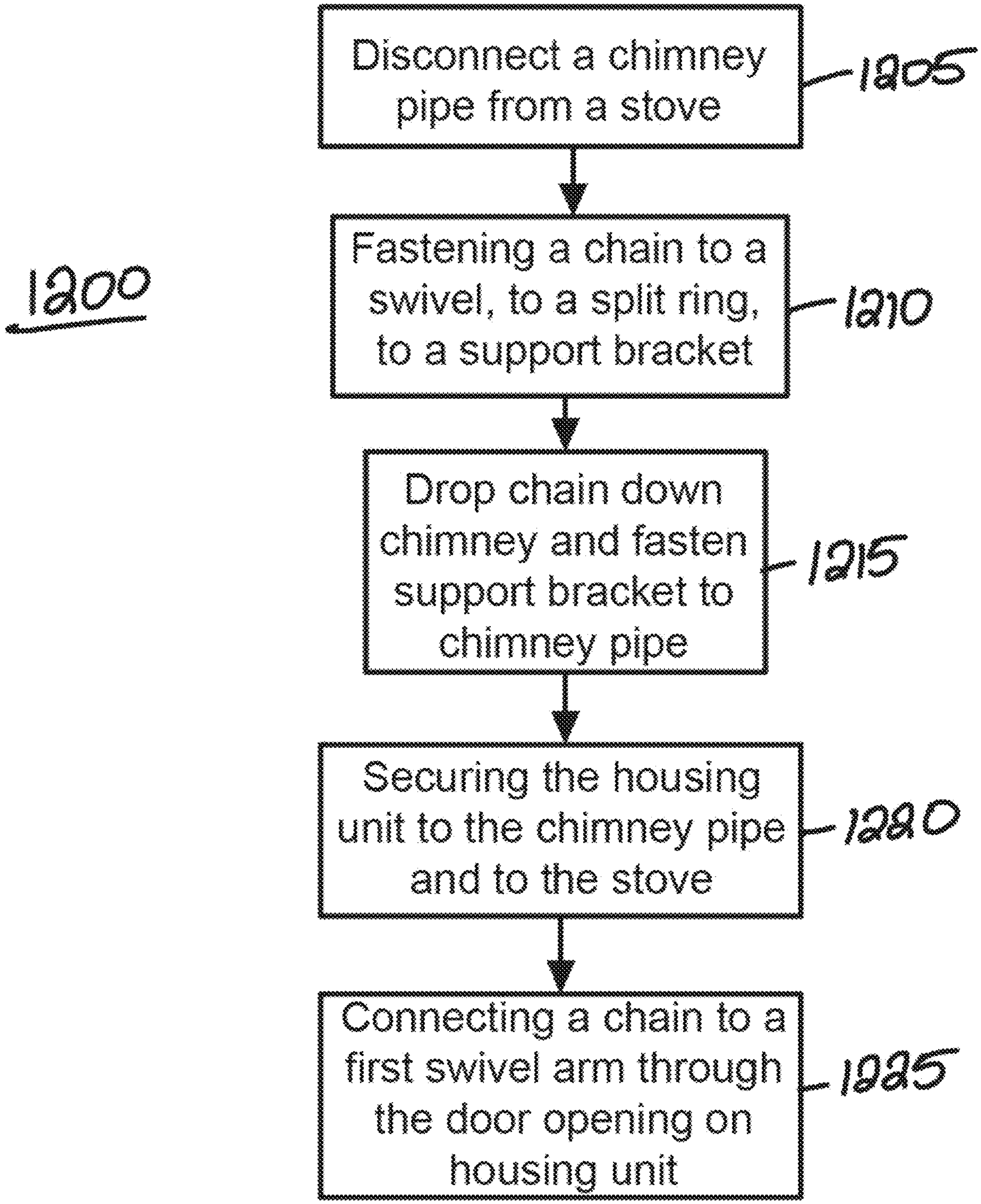
FIG. 12 is a flowchart illustrating a first method of installing the chimney cleaning system.
Figure 13:
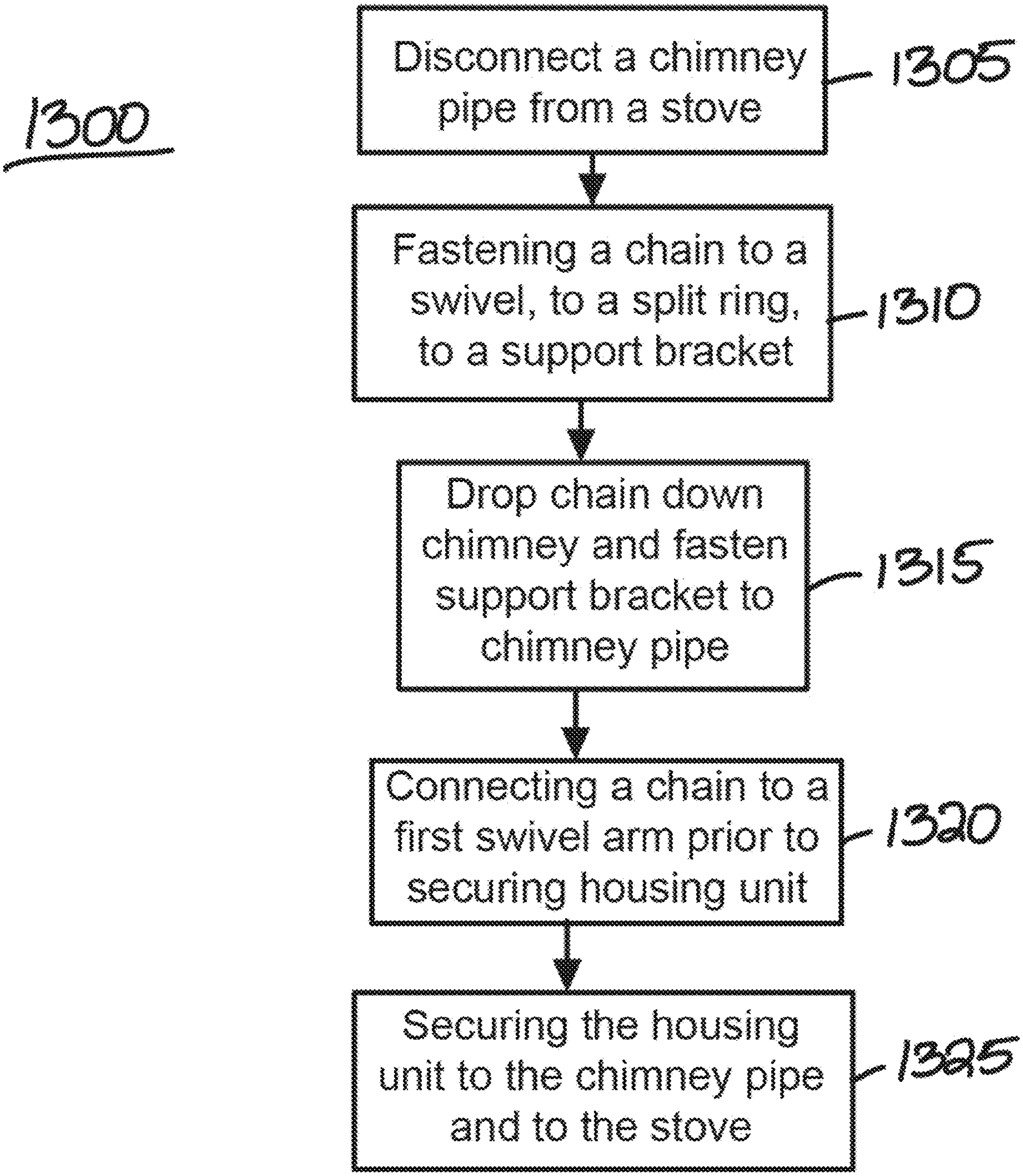
FIG. 13 is a flowchart illustrating a second method of installing the chimney cleaning system.

FIGS. 12 and 13 are flowcharts illustrating a method 1200, 1300 of installing the chimney cleaning system 100. In methodologies directly or indirectly set forth herein, various steps and operations are described in one possible order of operation but those skilled in the art will recognize the steps and operations may be rearranged, replaced or eliminated without necessarily departing from the spirit and scope of the present disclosure. It is intended that all matter contained in the below description or shown in the accompanying drawings shall be interpreted as illustrative only and not limiting. Changes in detail or structure may be made without departing from the spirit of the present disclosure as defined in the appended claims.

Referring to FIG. 12, the user may disconnect a chimney pipe 105 from a stove 110 (Block 1205). In one example, the user may remove the screws, the rivets, or the like to separate the chimney pipe 105 from the stove 110. In one example, the user may then connect the chain 120 to the split ring 117*a*, then connect the split ring 117*a* to the swivel 119, which the user connects the swivel 119 to the first swivel arm 125 (Block 1210). The user may ascend to their roof to remove the rain cap from the chimney pipe 105. The user will then drop the chain 120 down the chimney pipe 105 and fasten the support bracket 115 to the second end 170 of the chimney pipe 105 (Block 1215). If the user has a single wall chimney pipe 105, the user installs the embodiment of the support bracket 115 with the second housing unit 1041. In this way, the user installs the support bracket 115 by setting the second housing unit 1041 on top of the existing single wall chimney pipe 105. If the user has a triple wall chimney pipe 105, the user installs the embodiment of the support bracket 115 with the outward facing tabs. In this way, the support bracket 115 securement tabs 805*a-d* may be bent upward to be fastened to the second end 170 of the chimney pipe 105 via screws, rivets, collar, press fit, or the like. The user may connect the rain cap back onto the chimney pipe 105. The user joins the housing unit 140 to the stove 110 and to the chimney pipe 105 (Block 1220). The housing unit 140 is fastened to the stove 110 and chimney pipe 105 via screws, rivets, a press fit, or the like. The user may then remove the appropriate amount of chain 120 such that there is proper slack of the chain 120 to make proper contact with the chimney pipe 105. The user may then connects the chain 120 to the second swivel arm 135 housed in the housing unit 140 through the door 155 opening via a split ring 117*b* (Block 1225). It should be understood that logical operations may be performed in any order, unless explicitly claimed otherwise or a specific order is inherently necessitated by the claim language. Additionally, some of the operations described may be skipped or not included in the method 1200.

FIG. 13 is a flowchart illustrating a method 1300 of installing the chimney cleaning system 100 where the housing unit 140 does not have a door. The user may disconnect a chimney pipe 105 from a stove 110 (Block 1305). In one example, the user may remove the screws, the rivets, or the like to separate the chimney pipe 105 from the stove 110. In one example, the user may then connect the chain 120 to the split ring 117*a*, then connect the split ring 117*a* to the swivel 119, which the user connects the swivel 119 to the first swivel arm 125 (Block 1310). The user may ascend to their roof to remove the rain cap from the chimney pipe 105. The user will then drop the chain 120 down the chimney pipe 105 and fasten the support bracket 115 to the second end 170 of the chimney pipe 105 (Block 1315). If the user has a single wall chimney pipe 105, the user installs the embodiment of the support bracket 115 with the second housing unit 1041. In this way, the user installs the support bracket 115 by setting the second housing unit 1041 on top of the existing single wall chimney pipe 105. If the user has a triple wall chimney pipe 105, the user installs the embodiment of the support bracket 115 with the outward facing tabs. In this way, the support bracket 115 securement tabs 805*a-d* may be bent upward to be fastened to the second end 170 of the chimney pipe 105 via screws, rivets, collar, press fit, or the like. The user may connect the rain cap back onto the chimney pipe 105. The user may then remove the appropriate amount of chain 120 such that there is proper slack of the chain 120 to make proper contact with the chimney pipe 105. The user may then connect the chain 120 to the second swivel arm 135 housed in the housing unit 140 via a split ring 117*b* while the housing unit 140 is not attached to the chimney pipe 105 or the stove 110 (Block 1220). The user may then secure the housing unit 140 to the chimney pipe 105 and the stove 110 (1325). The housing unit 140 is fastened to the stove 110 and chimney pipe 105 via screws, rivets, a press fit, or the like. It should be understood that logical operations may be performed in any order, unless explicitly claimed otherwise or a specific order is inherently necessitated by the claim language. Additionally, some of the operations described may be skipped or not included in the method 1300.

It should be noted that any of the features in the various examples and embodiments provided herein may be interchangeable and/or replaceable with any other example or embodiment. As such, the discussion of any component or element with respect to a particular example or embodiment is meant as illustrative only.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present disclosure, and do not create limitations, particularly as to the position, orientation, or use of the present disclosure unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the present disclosure is not limited to components which terminate immediately beyond their point of connection with other parts. Thereby, the term "end" should be broadly interpreted, in a manner that includes areas adjacent rearward, forward of or otherwise near the terminus of a particular element, link, component, part, member or the like. In methodologies directly or indirectly set forth herein, various steps and operations are described in one possible order of operation but those skilled in the art will recognize the steps and operation may be rearranged, replaced or eliminated without necessarily departing from the spirit and scope of the present disclosure.

The terms "about" and "substantially" herein are to be construed as +/−10%, unless stated otherwise. Every range of values (of the form, "from about a to about b," or, equivalently, "from approximately a to b," or, equivalently, "from approximately a-b" or, equivalently, "greater than about a and less than about b") disclosed herein is to be understood to set forth every number and range encompassed within the broader range of values.

It is intended that all matter contained in the above description or shown in the accompanying drawings shall be interpreted as illustrative only and not limiting. Changes in detail or structure may be made without departing from the spirit of the present disclosure as defined in the appended claims.

The invention claimed is:

1. A chimney cleaning system, the system comprising;

a support bracket configured to couple with a chimney pipe having an internal surface;

a first swivel arm and a second swivel arm;

a gearbox;

a shaft coupled to the gearbox;

a housing unit configured to couple to a stove and the chimney pipe, wherein the gearbox, the shaft, and the second swivel arm are received in the housing unit;

a spring coupled with the first swivel arm; and a chain having a first end and a second end, the first end coupled with the first swivel arm via the spring and the second end coupled to the second swivel arm, wherein actuation of the shaft causes rotation of the chain about the internal surface of the chimney pipe thereby causing the chain to clean soot, creosote, and other debris from at least a portion of the internal surface of the chimney pipe.

2. The chimney cleaning system of claim 1, further comprising a door defined in the housing unit, the door providing access to the gearbox, the chain, and the second swivel arm.

3. The chimney cleaning system of claim 2, wherein the housing unit and/or the door is made of a metal material.

4. The chimney cleaning system of claim 1, wherein the spring is a tension spring.

5. The chimney cleaning system of claim 1, wherein the first swivel arm couples to the support bracket by a split ring.

6. The chimney cleaning system of claim 1, wherein the second swivel arm is coupled to the shaft.

7. The chimney cleaning system of claim 1, wherein the second swivel arm is coupled to the chain via a split ring.

8. The chimney cleaning system of claim 1, wherein the first and second swivel arm are made of stainless steel or other carbon steel rod.

9. The chimney cleaning system of claim 1, wherein the chain is a wire rope cable.

10. The chimney cleaning system of claim 1, wherein the shaft is a horizontal shaft.

11. The chimney cleaning system of claim 1, further comprising instructions for operation of the system to clean a chimney.

* * * * *